United States Patent
Kamindki

(10) Patent No.: US 9,131,542 B1
(45) Date of Patent: Sep. 8, 2015

(54) INDUCTIVELY HEATED CARAFE SYSTEM AND METHOD

(75) Inventor: Andrzej Kamindki, Warsawa (PL)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 794 days.

(21) Appl. No.: 13/406,005

(22) Filed: Feb. 27, 2012

Related U.S. Application Data

(60) Provisional application No. 61/447,213, filed on Feb. 28, 2011.

(51) Int. Cl.
*H05B 6/12* (2006.01)
*H05B 1/02* (2006.01)
*G01N 33/14* (2006.01)
*A47J 36/24* (2006.01)
*H05B 3/68* (2006.01)

(52) U.S. Cl.
CPC ............. *H05B 3/685* (2013.01); *A47J 36/2466* (2013.01)

(58) Field of Classification Search
CPC ............................ A47J 36/2466; H05B 3/685
USPC ............ 219/647, 386, 689, 732, 663; 99/286, 99/275, 297, 495, 279, 287, 308, 312, 99/DIG. 14, 288; 426/231, 241, 243, 520
See application file for complete search history.

(56) References Cited

U.S. PATENT DOCUMENTS 4,886,955 A * 12/1989 Kimura .................. 219/494

FOREIGN PATENT DOCUMENTS

JP          2002272619 A  *  9/2002

* cited by examiner

*Primary Examiner* — Quang Van
(74) *Attorney, Agent, or Firm* — Potthast & Associates; James W. Potthast

(57) ABSTRACT

An inductively heated beverage carafe system (10) with a non-metallic carafe (13) has a funnel assembly (26) with a down-tube (34, 54) made from material impervious to water to pass hot beverage received within the funnel assembly (26) to adjacent the bottom (14) of the carafe (13) without mixing with beverage already present in the carafe until (13) the newly added hot beverage passes out of the open outlet end (59) and which is, at least partly a material responsive to alternating electromagnetic fields to induce surface eddy currents that heat at least part of the down-tube (34, 54) and an inductive heating coil module (36) for supporting the carafe (14) and generating an electromagnetic field to energize at least part of the down-tube (34, 54) to function as an inductive heating element within the carafe (13).

18 Claims, 2 Drawing Sheets

INDUCTIVELY HEATED CARAFE SYSTEM AND METHOD

CROSS-REFERENCE TO RELATED APPLICATION

This application claims the benefit under 35 U.S.C. 119(e) of U.S. provisional patent application 61/447,213, filed Feb. 28, 2010, of the present inventor and bearing the same title as the present application.

BACKGROUND OF THE INVENTION

1. Field of the Invention

This invention generally relates to beverage carafe warmers, and, more particularly, to beverage warmers that employ inductive heating.

2. Discussion of the Prior Art

Beverage carafe warmers of the type that employ an electrically resistive heating pad, or base, upon which the carafe is supported are well known. A problem with such electrically resistive heating pad is that even when no carafe is present, they remain energized and may become quite hot and present burn risks to the users of the equipment. It is also known to provide carafes and the like with funnel assemblies having down-tubes attached to the bottoms of the assemblies to pass freshly brewed beverage from a hot beverage maker, such as a coffee brewer, to the bottom of the carafe to increase mixing of the beverage in the carafe through creation of convection currents. The freshly brewed beverage is hottest when first passed through the down-tube to the bottom. It, therefore, immediately begins to rise toward the top which pushes downwardly, along the sides, cooler beverage that had been previously added. Without the down-tube all of the hottest beverage would rise to the top and remain there.

It is known to use inductive heating in various situations, but such inductive heating has not been achieved in association with the advantages obtained with use of a down-tube in a carafe.

SUMMARY OF THE INVENTION

It is therefore an object of the present invention to provide a unique carafe heating system that employs a carafe with a funnel assembly having a down-tube that functions not only as a down-tube but also performs the additional function as an inductive heating element for heating the beverage fed into the carafe through the down-tube.

Specifically, it is an object of the invention to provide inductively heated beverage carafe system, having a non-metallic carafe with a closed bottom and an open top, a funnel assembly, said funnel assembly having an upper, funnel body mounted to the open top with an upwardly facing open top for receipt of beverage and a bottom with a drain hole, an elongate, tubular, down-tube, in fluid communication with the drain hole and having a distal open outlet end, attached to, and extending downwardly from the bottom of the funnel body to a location adjacent the bottom of the carafe, said down-tube being made from solid material impervious to water to freely pass newly added hot beverage received within the funnel body to adjacent the bottom of the carafe without mixing with any beverage already present in the carafe until the newly added hot beverage passes out of the distal open outlet end, said material of the down-tube being, at least in part, a material responsive to alternating electromagnetic fields to create surface eddy currents that heat the down-tube; and a inductive heating coil module for supporting the bottom of the carafe and generating an alternating electromagnetic field to energize at least part of the down-tube to function as an inductive heating element to heat any beverage within the carafe.

In one embodiment, the entire down-tube is made from said electromagnetic responsive material while in another embodiment only a portion of the down-tube adjacent the distal open outlet end is made from the electromagnetic responsive material.

Preferably, the inductive heating coil module includes an induction heating coil, means for applying an alternating electrical power signal to the coil, and means for selectively controlling one of the frequency or the alternating electrical power signal applied to the coil to selectively control the rate at which the down-tube is heated.

In the preferred embodiment, an underlying base is provided to support the carafe and the inductive heating module is an integral part of the base.

In the embodiment in which the beverage carafe system is incorporated into a hot beverage brewer the hot beverage brewer has a controller for controlling functional brewing operations of the brewer, and the controller includes means for selectively controlling at least one of (a) power level and (b) frequency, of an electrical power signal power level applied to induction coil. The brewer also preferably includes a digital display, and the controller includes means for enabling selection of different heating levels that can be provided by the inductive coil that are shown on the display.

Another object of the present invention is to provide a method of heating a freshly brewed hot beverage by performance of the steps of passing the hot beverage into a non-metallic carafe with a closed bottom and an open top by first passing the beverage into a funnel assembly mounted to a top closure member releasably mounted to the open top, said funnel assembly having an upper, funnel body mounted to the open top with an upwardly facing open top smaller than the open top of the carafe for receipt of beverage and a bottom with a drain hole, and an elongate, tubular, down-tube, made from solid material impervious to beverage and, at least in part, responsive to alternating electromagnetic fields to create surface eddy currents that heat the down-tube, said down-tube being in fluid communication with the drain hole and having a distal open outlet end, attached to, and extending downwardly from the bottom of the funnel body to a location adjacent the bottom of the carafe, freely passing newly added hot beverage received within the funnel body down the down-tube to the location adjacent the bottom of the carafe without mixing with any beverage already present in the carafe until the newly added hot beverage passes out of the distal open outlet end, supporting the bottom of the carafe on an inductive heating coil module; and generating an alternating electromagnetic field that interacts with the electromagnetic responsive material of the down-tube to cause at least part of the down-tube to function as an inductive heating element to heat any beverage within the carafe.

In one embodiment the entire down-tube is made from said electromagnetic responsive material, and the method includes the steps of including the step of generating an alternating electromagnetic field that interacts with the entire down-tube. In another embodiment, only a portion of the down-tube adjacent the distal open outlet end is made from the electromagnetic responsive material, and the method includes the steps of generating an alternating electromagnetic field that interacts with the entire down-tube.

Preferably, the inductive heating coil module includes an induction heating coil, and the method includes the steps of applying an alternating electrical power signal to the coil, and selectively controlling the frequency of the alternating electrical power signal, the AC power level, or both, of the alternating electrical power signal applied to the coil.

In another embodiment, the inductively heated beverage carafe system is incorporated into and made part of a brewer, with a brewer controller for controlling functional brewing operations of the brewer, the method includes the step of selectively controlling at least one of (a) power level and (b) frequency, of an electrical power signal power level applied to induction coil with the controller.

Preferably, the brewer includes a digital display, and the method includes showing different heating levels that can be provided by the inductive coil on the display, and manually selecting one of the different heating levels.

BRIEF DESCRIPTION OF THE DRAWINGS

The forgoing objects, features and advantages of the inductively heated carafe system and method of the present invention will be disclosed in detail while others will be made apparent from the following detailed description of the preferred embodiment, which is given with reference to the several figures of the drawing, in which.

DETAILED DESCRIPTION

Figure 1:
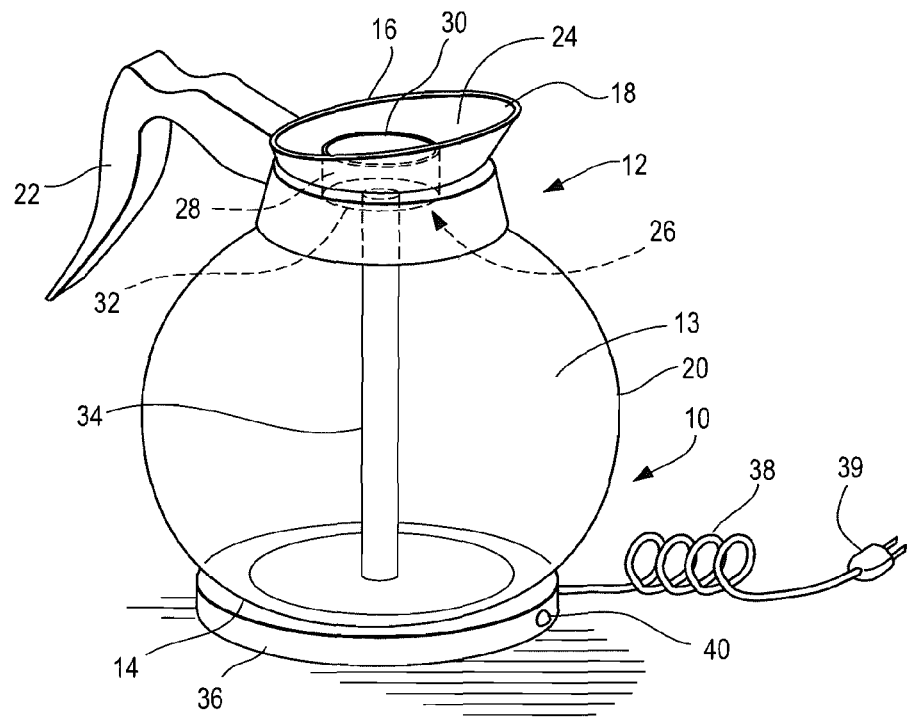
FIG. 1 is a schematic, perspective illustration of the carafe, energizable down-tube assembly with an energizable down-tube with an inductive heating coil of the induction heated carafe system of the present invention.
Figure 2:
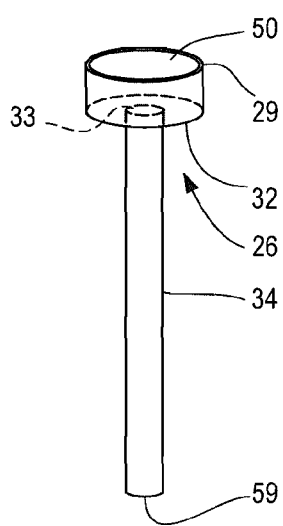
FIG. 2 is a schematic, perspective illustration of the removable energizable down-tube assembly apart from the carafe.

Referring to FIGS. 1 and 2, the induction heated carafe system 10 includes a carafe assembly 12 with an integrally formed carafe body 13. The carafe body has a closed, flat, round bottom 14 and a generally circular open top 16 with a pour spout 18. An arcuate side wall 20, with a generally round, variable diameter, cross section, extends between the bottom 14 and the open top 16. Preferably, all the parts of the entire carafe body 13 are integrally molded together from a non-metallic, heat resistant or heat insulating material, such as heat tempered glass or a high temperature resistant polymeric material. A separate handle 22 that is attached to the side wall 20 is made from a suitable insulating, heat resistant, plastic material.

Closing the open top 16 is a removable, round, fitted cover 24 that closes the open top except for a side opening at the spout 18. The cover 24 is preferably made of temperature resistant, insulating plastic and fits snugly into the open top 16 to reduce the loss of heat through the open top 16. In accordance with the invention, within the cover 24 is a circular mounting hole, within which is removably received and mounted an energizable down-tube assembly 26.

The energizable down-tube assembly 26 includes an insulating funnel cap 28 with a round open top 30 for receipt of freshly brewed beverage from an associated coffee maker or the like. Extending from a bottom 32 of the funnel cap 28 is an energizable down tube 34. Pursuant to the invention, the energizable down-tube 34 is made from a material that is capable of being energized and heated in response to surface current induced by a local alternating electromagnetic field. Also, the material of the down-tube 34 is solid and continuous material impervious to water to freely pass newly added hot beverage received within the funnel body to adjacent the bottom 14 of the carafe 13 without mixing with any beverage already present in the carafe until the newly added hot beverage passes out of the distal open outlet end 59.

Preferably, the energizable and water impervious material from which the energizable down-tube is made at least in part is a magnetic bearing stainless steel, such an 18/0 alloy with 18% chromium and no nickel. The surface of this alloy is heated by surface electrical eddy currents induced by the electromagnetic waves created by a local induction coil of an induction heating coil module 36. For use with a half-gallon carafe, the energizable down-tube 34 is approximately 5-6 inches long with a ⅜-½-inch outer diameter and a wall thickness of approximately ⅛-1/16-inch.

The funnel cap 28 diameter, is approximately 2-2½-inches and has a circular, radially outwardly extending collar 29 at its top edge upon which the funnel cap 28 is supported by the portion of the cover 24 surrounding the funnel cap mounting hole in the cover 24. The cylindrical side of the funnel cap 28 fits snugly through the mounting hole and extends downwardly beneath the cover 24 and into the interior of the carafe body 13.

The carafe body 13 rests on top of an induction heating coil module 36 which includes an induction heating coil (not shown) encased within a protective, water proof, temperature resistant cladding that is permeable to electromagnetic waves. The induction heating coil is powered from standard AC power received though power cord 38 and plug 39. A high frequency wave generator within the module 36 generates an alternating electromagnetic wave through the cladding and the carafe body 13 and energizes the energizable down-tube 34. The frequency of the heat inducing electromagnetic waves is preferably in the range of 1-kHz to 100-kHz with an output power of approximately 1-100 watts to 100-500 watts to keep the beverage in the carafe assembly 12 at a temperature of approximately 160-180-degrees Fahrenheit.

Generally, the higher the frequency of the alternating induced current, the shallower the heating of the part being heated. Frequencies of 100-kHz to 400-kHz produce relatively high-energy heat for quick heating of relatively small parts, such as the tip 58 or surface/skin of larger parts, such as the down-tube 34. On the other hand, deep, penetrating heat may be more effectively obtained at lower frequencies of 5-kHz to 30-kHz. The exact frequencies and power settings must be empirically determined based on the type of beverage being heated, the size of the carafe, the initial temperature of the beverage and the desired temperature at which it is to be maintained.

A controller (not shown) connected to a rotary switch 40 may be provided to vary both the input power to the wave generator and the frequency of the generate wave. The manual switch 40 may be used to selectively apply power to the electromagnetic wave generator. If the induction heating coil module 36 is part of a brewer, such as shown in FIG. 4, as opposed as a stand alone warming unit, both the level of the input power to the generator and the frequency of the electromagnetic induction wave may be selectively varied both during the brewing process while the carafe is being filled afterwards once the carafe is filled. A safety shut-off sensor may be used at these low currents that would detect any undesired actuation by any stray iron bearing objects within the electromagnetic heating field Referring to FIG. 3, in lieu of the energizable down-tube assembly 26 in which the entire length of the down-tube 34 is made, in part, from ferromagnetic, magnetic or other material that facilitates the generation of surface eddy currents that produce surface heat, an energizable down-tube assembly 52 is employed. The energizable down-tube assembly 52 has a down-tube 54 that is made of magnetically inert material such a suitable insulting polymeric material. Advantageously, the down tube 54 may be integrally molded together with the associated funnel cap 56 which may be made of the same material. In order to obtain induction heating of the beverage within the carafe with the down-tube assembly 52, a energizable, cylindrical, tubular tip 58 is provided that is attached to the bottom of the down-tube 54. The tip 58 is made from material in which surface eddy currents may be induced by an electromagnetic wave. Preferably, the tip is made from the same material from which the entire down-tube 34 is made, i.e. 18/0 stainless steel with 18% chromium and 0% nickel. The tip 58 is preferably brazed or soldered to the down-tube 54. Alternatively, if the tip is generally non-metallic, then the tip may be attached by interference fit with barbed catches or stamped fasteners.

When the energizable down-tube assembly 34 of FIG. 2 is used, it should be appreciated that the strength of the electromagnetic wave impinging the down-tube 34 is less at the top of the down-tube where it is the maximum distance from the electromagnetic wave generator of the induction heating coil module than at the bottom where it is closest, particularly in the case of the down tube 54 with end tip 58. Advantageously, then there is greater heating at the bottom of the carafe where the coolest portions of the beverage settle while the heating becomes less as the top surface of the beverage is approached to where the hottest part of the beverage naturally rises. Greater resistance in the down-tube material results in greater heating and increased temperature results in greater heating. The portion of the down-tube in the beverage will generally be hotter than the air above, so the greatest amount of heating will occur where the down-tube 34 is in direct contact with the beverage and not in the relatively insulating air above the beverage for increased efficiency. Thus, good convection currents are developed for a uniform temperature throughout the carafe body 13.

Figure 3:
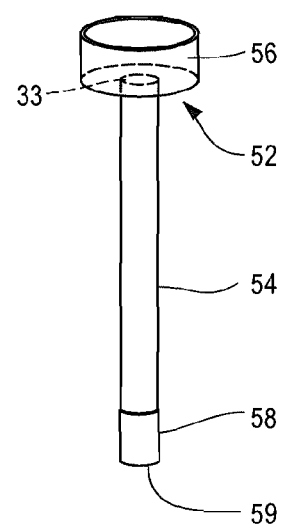
FIG. 3 is schematic, perspective side-view illustration of another embodiment of a removable energizable down-tube assembly that may be used in lieu of the one illustrated in FIGS. 1 and 2.
Figure 4:
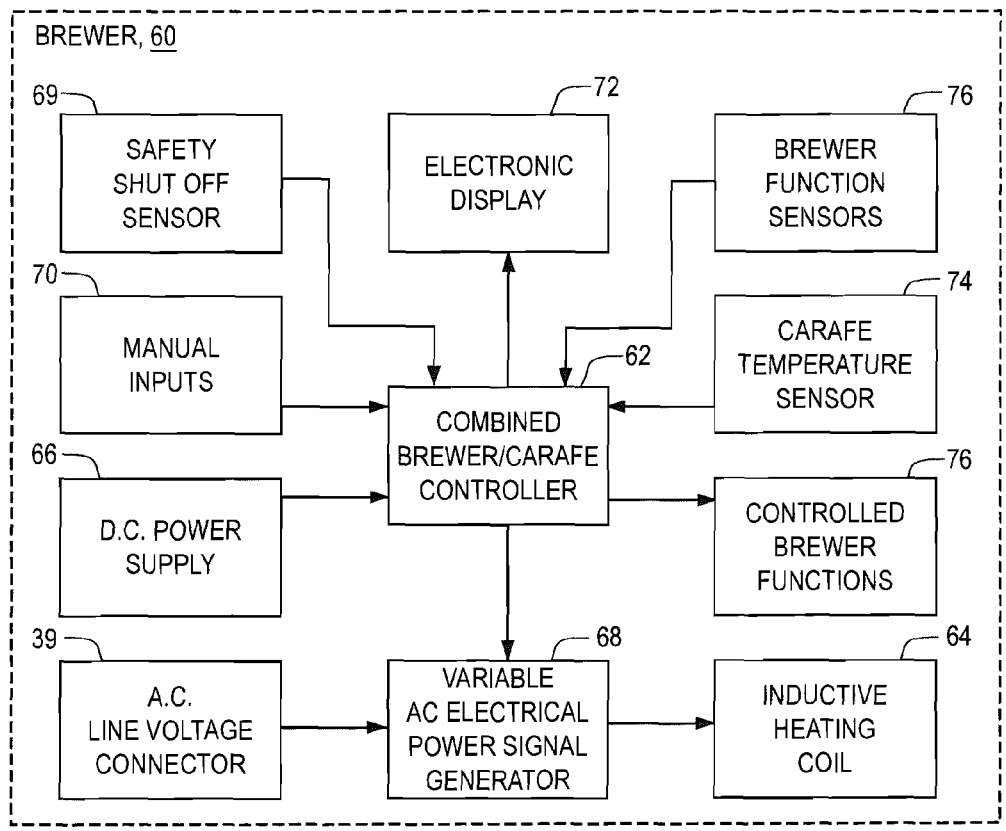
FIG. 4 is a functional block diagram of another embodiment of the invention in which the inductively heated carafe system is incorporated into and made a part of a hot beverage brewer with a controller that controls the brewer functions as well as the level of heating provided by the inductively heated carafe system

In the case of the energizable down-tube assembly 54 of FIG. 3, the tip 58 is located adjacent the bottom 14 of the carafe body 13, and thus its entirety is almost always submerged beneath the surface of the beverage and is generally entirely located adjacent the strongest part of the electromagnetic field.

It should be appreciated that the induction heated carafe system 10 of the present invention may be used either as a stand-alone unit spaced from the brewer location at which the carafe is filled with freshly brewed beverage or spaced from a dispenser location at which the carafe is filled with pre-prepared beverage from a larger dispenser. In such case, manual controls may be provided in association with induction heating coil module 36 for controlling both the power and frequency of the generated electromagnetic heat induction wave to control the rate of heating and temperature. A controller may be provided to automatically change the frequency or the output power or both in response to the temperature of the physical interface between the bottom 14 of the carafe body 13, as sensed by a temperature sensor, so as to match the sensed temperature with the temperature selected by a manual temperature setting switch. A stand alone unit may be used to not only maintain a preselected warming temperature but could also be used to elevate the temperature sufficiently high to boil water, for instance.

Referring to FIG. 4, in accordance with one aspect of the present invention, the inductively heated carafe system is incorporated into and made an integral part of a hot beverage brewer, such as a coffee brewer 60. In such case, a controller 62 associated with the brewer 60 would also be used to control the inductive heating coil 64 of the base module 40 during a coffee making cycle and afterwards. The combined brewer and carafe heating controller 62 is powered by a DC voltage generated by a DC power supply 66 which is connected to the AC line voltage connector, or connector plug, 39 via the power cord 38. The AC line voltage is also applied through the power cord 38 to a variable frequency and power level AC electrical signal generator 68. The variable frequency and power level signal generator 68 passes an electrical AC power signal to the inductive coil 64 of the base module 40 with a frequency and a power level that are determined by input control signals from the combined brewer and carafe controller 62. The safety shut off sensor 69 also provides an input to the controller 62 to shut off power to the induction coil in the event of detection of stray or extraneous metal objects within the influence of the magnetic field.

These input temperature control signals are determined in part by the controller 62 based on a selected heated temperature chosen by an operator, or user, by means of manual inputs 70. The manual inputs may be individual manual actuation switches, or virtual or touch screen display inputs of an electronic display 72. In any event, after a temperature has been selected, the controller 62 compares the selected heated temperature with the temperature of the beverage in the carafe 13 as sensed by an infrared carafe temperature sensor 74 or by an electronic temperature sensor for sensing the temperature of the base 40. If the selected temperature is beneath the sensed temperature, then the controller changes the frequency, the magnitude or both of the AC electrical power signal generated the electrical power signal generator 68 and applied to the inductive heating coil to increase the amount of inductive energy received by the down-tube 34 to increase the beverage temperature. When selected temperature is above the sensed temperature, then the electrical power signal generator 68 is controlled to lower the level of energy induced in the down-tube 34 to lower the temperature of the beverage in the carafe 13 the exact power levels and frequency needed to maintain a given beverage temperature depends upon the size of the carafe, the down-tube material, the size of the induction coil and other factors and need to be determined empirically.

Advantageously, the controller 62 also functions to control all of the brewer controlled functions 76, such as hot water tank temperature, hot water tank level and time duration for dispensing hot water from the tank into a brew basket with dry beverage ingredient for brewing, by-pass percentage or amount, drip time periods, etc. in response to various brewer function sensors 78, such as temperature sensors, level sensors and parameters set by manual inputs 70 and stored in memory of the controller 62.

While detailed embodiments of the invention has been provided, it should be appreciated by those of skill in the art that many obvious variations may be made with respect to these details without departing from the spirit and scope of the invention.

The invention claimed is:

1. An inductively heated beverage carafe system, comprising:
 a non-metallic carafe with a closed bottom and an open top;
 a funnel assembly, said funnel assembly having an upper, funnel body mounted to the open top with an upwardly facing open top for receipt of beverage and a bottom with a drain hole, an elongate, tubular, down-tube, in fluid communication with the drain hole and having a distal open outlet end, attached to, and extending downwardly from, the bottom of the funnel body to a location adjacent the bottom of the carafe, said down-tube being made from solid material impervious to water to freely pass newly added hot beverage received within the funnel body to adjacent the bottom of the carafe without mixing with any beverage already present in the carafe until the newly added hot beverage passes out of the distal open outlet end, said material of the down-tube being, at least in part, a material responsive to alternating electromagnetic fields induce surface eddy currents that heat the down-tube; and an inductive heating coil module for supporting the bottom of the carafe and generating, an alternating electromagnetic field to energize at least part of the down-tube to function as an inductive heating element to heat any beverage within the carafe.

2. The inductively heated beverage carafe system of claim 1 in which the entire down-tube is made from said electromagnetic responsive material.

3. The inductively heated beverage carafe system of claim 1 in which only a portion of the down-tube adjacent the distal open outlet end is made from the electromagnetic responsive material.

4. The inductively heated beverage carafe system of claim 1 in which the inductive heating coil module includes
an induction heating coil,
means for applying an alternating electrical power signal to the coil, and
means for selectively controlling the frequency of the alternating electrical power signal applied to the coil.

5. The inductively heated beverage carafe system of claim 1 in which the inductive heating, coil module includes
an induction heating coil,
means for applying an alternating electrical power signal to the coil, and
means for selectively controlling the AC power level of the alternating electrical power signal applied to the coil signal.

6. The inductively heated beverage carafe system of claim 5 including means for selectively controlling the frequency of the alternating electrical power signal applied to the coil.

7. The inductively heated beverage carafe system of claim 1 including
a hot beverage brewer with an underlying base, and in which
the inductive heating module is an integral part of the base.

8. The inductively heated beverage carafe system of claim 7 in which
the hot beverage brewer has a controller for controlling functional brewing operations of the brewer, and
the controller includes means for selectively controlling at least one of (a) power level and (b) frequency, of an electrical power signal power level applied to induction coil.

9. The inductively heated beverage carafe system of claim 8 in which
the brewer includes a digital display, and
the controller includes means for enabling selection of different heating levels that can be provided by the inductive coil that are shown on the display.

10. A method of heating a freshly brewed hot beverage, comprising the steps of:
passing the hot beverage into a non-metallic carafe with a closed bottom and an open top by first passing the beverage into a funnel assembly mounted to the open top
said funnel assembly having
an upper, funnel body mounted to the open top with an upwardly facing open top for receipt of beverage and a bottom with a drain hole, and
an elongate, tubular, down-tube, made from solid material impervious to beverage and, at least in pan, responsive to alternating electromagnetic fields to induce surface eddy currents that heat the down-tube, said down-tube being in fluid communication with the drain hole and having a distal open outlet end, attached to, and extending downwardly from the bottom of the funnel body to a location adjacent the bottom of the carafe;
freely passing newly added hot beverage received within the funnel body down the down-tube to the location adjacent the bottom of the carafe without mixing with any beverage already present in the carafe until the newly added hot beverage passes out of the distal open outlet end,
supporting the bottom of the carafe on an inductive heating coil module; and
generating an alternating electromagnetic field that interacts with the electromagnetic responsive material of the down-tube to cause at least part of the down-tube to function as an inductive heating element to heat any beverage within the carafe.

11. The beverage heating method of claim 10 in which
the entire down-tube is made from said electromagnetic responsive material, and including the step of
generating, an alternating electromagnetic field that interacts with the entire down-tube.

12. The beverage heating method of claim 10 in which
only a portion of the down-tube adjacent the distal open outlet end is made from the electromagnetic responsive material, and including the step of
generating an alternating electromagnetic field that interacts with the entire down-tube.

13. The beverage heating method of claim 10 in which the inductive heating coil module includes
an induction heating coil, and including the steps of
applying an alternating electrical power signal to the coil, and
selectively controlling the frequency of the alternating electrical power signal applied to the coil.

14. The beverage heating method of claim 10 in which
the inductive heating coil module includes an induction heating coil, and including the steps of
applying an alternating electrical power signal to the coil, and
selectively controlling the AC power level of the alternating electrical power signal applied to the coil.

15. The beverage heating method of claim 14 including the step of selectively controlling the frequency of the alternating electrical power signal applied to the coil.

16. The beverage heating method of claim 10 including
a coffee brewer with an underlying base, and in which
the inductive heating, module is an integral part of the base.

17. The beverage heating method of claim 16 in which
the coffee brewer has a controller for controlling functional
brewing operations of the brewer, and including the step of
selectively controlling at least one of (a) power level and (b) frequency, of an electrical power signal power level applied to induction coil with the controller.

18. The beverage heating method of claim 17 in which
the brewer includes a digital display, and including the steps of
showing different heating levels that can be provided by the inductive coil on the display, and
manually selecting one of the different heating levels.

\* \* \* \* \*